Figure 1:
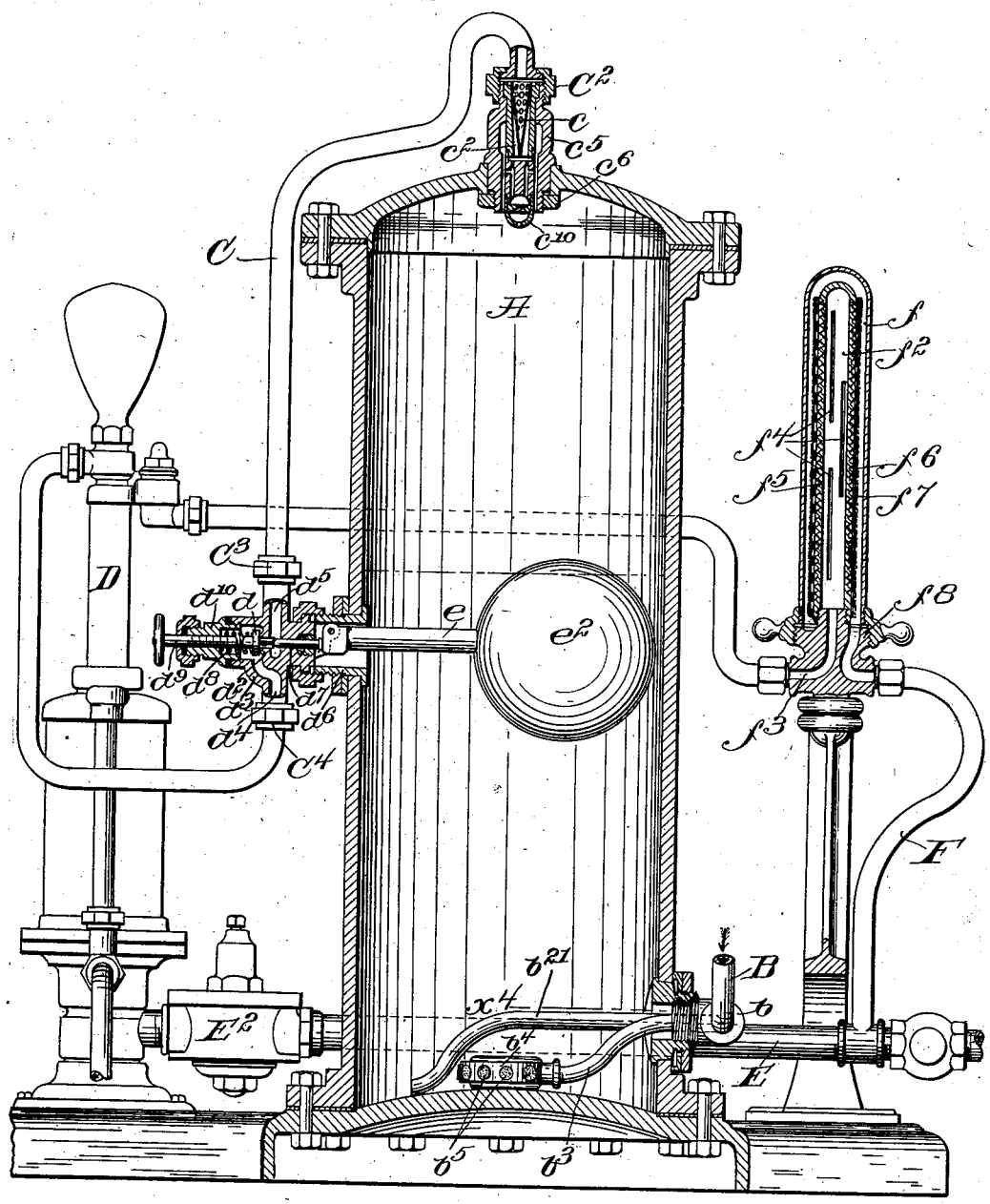

No. 724,727. PATENTED APR. 7, 1903.
E. E. MURPHY.
CARBONATOR.
APPLICATION FILED SEPT. 25, 1902.
NO MODEL. 2 SHEETS—SHEET 1.

Witnesses:
Jas. M. Maloney.
Nancy P. Ford.

Inventor:
Edward E. Murphy,
by J. P. and H. J. Livermore
Attys.

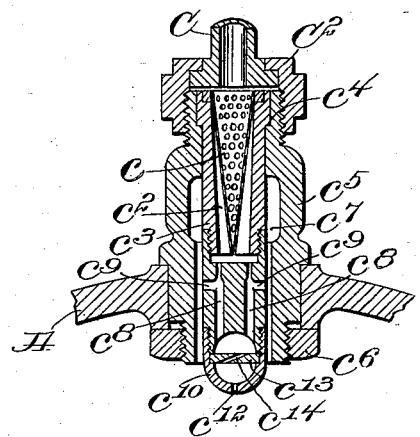
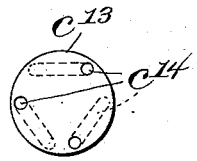
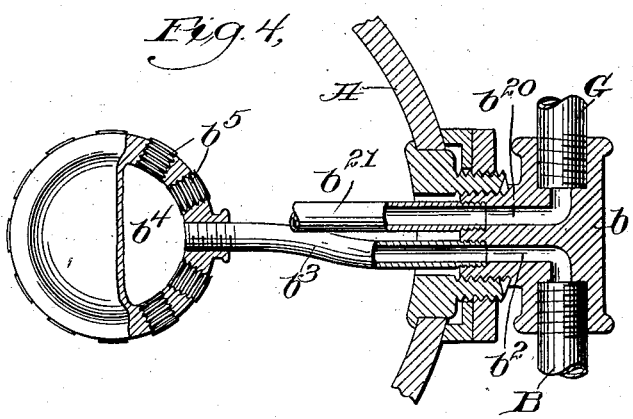

UNITED STATES PATENT OFFICE.

EDWARD E. MURPHY, OF CHELSEA, MASSACHUSETTS, ASSIGNOR TO PUFFER MANUFACTURING COMPANY, OF BOSTON, MASSACHUSETTS, A CORPORATION OF MAINE.

CARBONATOR.

SPECIFICATION forming part of Letters Patent No. 724,727, dated April 7, 1903.

Application filed September 25, 1902. Serial No. 124,854. (No model.)

*To all whom it may concern:*

Be it known that I, EDWARD E. MURPHY, of Chelsea, county of Suffolk, and State of Massachusetts, have invented an Improvement in Carbonators, of which the following description, in connection with the accompanying drawings, is a specification, like letters on the drawings representing like parts.

The present invention relates to a carbonator and is embodied in certain novel features of construction and arrangement whereby the gas and water are more thoroughly intermingled, the water purified, and the supply of water automatically controlled to the best advantage.

The invention is herein shown as embodied in a carbonator having a receiver which may be of the usual construction adapted to receive water and gas, the former being pumped into the receiver while the latter is admitted from any suitable source, such as one of the gas-tubes now in commercial use. In the construction shown the water is arranged to be supplied from an ordinary pipe system, such as a city supply, a portion of the water being utilized to operate a pump, which in turn acts upon the water supplied thereto through a branch pipe to force the water into the receiver against the pressure of the gas, this being a common expedient and chosen merely as an illustration, since it forms no part of the invention. The water which is supplied to the receiver by the pump is purified by means of a filter comprising inner and outer chambers, one of which constitutes the inlet and the other the outlet, the inner chamber having openings in the walls thereof and a corrugated outer surface to afford channels whereby the water can reach the said openings, the said surface being covered with a foraminous metal covering, which in turn is covered with porous material, such as felt. The water, therefore, in passing through the filter must permeate the felt, which retains all the impurities, it being practicable to remove the felt or whatever material is used from time to time when fouled. The gas is supplied to the receiver through an inlet near the bottom thereof, the said inlet terminating in a chamber having a series of outlets each of which is formed of some porous material which divides up the inflowing current of gas, so that it dissolves more readily in the water which is in the receptacle. The outlets from the chamber may be screw-threaded, so as to receive pieces of ratan which may be externally threaded and screwed into the said outlets, the fiber of ratan being such that each piece has a number of small longitudinal passages extending through it, thus constituting a suitable outlet for the purpose. To aid further in the rapid and intimate mixture of the gas and water, the receiver is provided with a water-inlet of novel construction and arrangement which constitutes not only a spraying-inlet for the water, but also an inspirator, so that a certain amount of gas is entrained by the water, which, therefore, when it enters the receiver is very finely divided or fogged, thus mixing intimately with the gas and becoming thoroughly carbonated as it collects in the receiver. To control the supply of water, the inlet-passage which leads from the pump to the receiver is provided with a valve of novel construction and arrangement, which valve is controlled by a ball within the receiver, the said ball being solid and of nearly the same specific gravity as that of the water, so that it must be almost entirely submerged in order to be supported. The said ball when not so supported acts upon the valve to open the same, there being an operating member interposed between the ball and the valve-stem, which passes through a stuffing-box, so that the valve can be removed for cleaning or repairs without opening the receiver or reducing the gas-pressure therein, the water-inlet pipe being provided also with a check-valve, which prevents the escape of gas when the controlling-valve is removed.

Figure 1 is a vertical section of a carbonator embodying the invention; Fig. 2, an enlarged sectional detail showing the water-inlet; Fig. 3, a detail showing the means for spraying the water; Fig. 4, a horizontal section on the line $x^4$ of Fig. 1, showing the gas-inlet; and Fig. 5, a vertical section showing a portion of the gas-inlet.

The receiver A, which may be of the usual shape and dimensions, is adapted to be supplied with gas through an inlet-pipe B, leading from any suitable source, and with water through an inlet-pipe C, leading from a pump D, which may be of any suitable or usual type, being herein shown as a motor-pump adapted to be driven by water entering through a pipe E, having a pressure-regulator or reducing-valve $E^2$, the water to be carbonated being supplied to the pump proper through a branch pipe F from the same source. To purify the water which is to be carbonated, the supply-pipe F is shown as provided with a filter, which comprises a chamber $f$, into which the water passes from the pipe F, and another chamber $f^2$, provided with an outlet $f^3$, from which the water passes to the pump D. The chamber $f^2$ is closed except for the outlet $f^3$ and one or more openings $f^4$ in the wall thereof, the said openings $f^4$ being herein shown as narrow slits, while the outer wall of the chamber $f^2$ is corrugated, as indicated at $f^5$, the corrugations forming channels along which the water can flow toward the openings $f^4$. Surrounding the corrugated outer wall of the chamber $f^2$ is a foraminous metallic covering $f^6$, over which is a further covering $f^7$, of porous material, preferably a fabric such as felt, the said covering $f^7$ being preferably in the form of a sleeve, which is drawn tightly over the outer surface of the said metallic covering $f^6$. The wall of the outer chamber $f$ is shown as a cylindrical shell adapted to be screwed onto a coupling-piece $f^8$, so that it can be readily removed in order that the covering $f^7$ may be taken off and replaced as frequently as may be desirable. The filtered water is supplied by the pump D to the pipe C, which is coupled to the top of the receiver as by a gland $C^2$, the water from the pipe being subjected, before it enters the receiver, to the action of a spraying device of novel construction and arrangement. (See Fig. 2.) At the upper portion of said spraying device is a conical strainer $c$, the purpose of which is to intercept any foreign substances which may come from the pump, the water passing through the said strainer into a chamber $c^2$, which is shown as formed in a tubular member $c^3$, having a shoulder $c^4$, supported in the upper portion of a shell $c^5$, which passes through an opening in the top of the receiver A and is clamped therein by means of a nut $c^6$. The member $c^5$ is so shaped as to afford an annular space $c^7$ around the member $c^3$, into which space the gas in the receiver A rises, so that the said member is always surrounded by gas under pressure.

Secured to the lower end of the member $c^3$ is the spraying device proper, the said spraying device being shown as provided with two or more passages $c^8$ to receive the water from the chamber $c^2$, the said passages being provided with lateral inlets $c^9$, communicating with the annular space $c^7$, so that as the water passes through it will entrain with it a certain amount of gas. In the lower end of this member is secured a cap $c^{10}$, having a small aperture $c^{12}$, which constitutes the water-outlet, the said cap being shown as hemispherical in shape, with the outlet $c^{12}$ at the middle. Interposed between the cap and the water-passages $c^8$ there is a wall or partition $c^{13}$, having openings $c^{14}$ for the water, the said openings, as indicated in Fig. 3, being formed diagonally through the wall, so that the water, with the entrained gas, in passing through is deflected against the walls of the shell $c^{10}$ and given a rotating or whirling movement, which results in causing the water to be finely divided or sprayed as it issues from the opening $c^{12}$. This spraying of the water, in conjunction with the admixture of gas entrained through the passages $c^9$, causes the water to enter the receiver in the form of very finely-divided spray or mist, so that it mixes thoroughly with the gas before it collects at the bottom of the receiver. The gas which enters the receiver A at the bottom from the pipe B is shown as led into the receiver through a passage $b^2$ in a coupling-piece $b$, the said passage $b^2$ communicating with the pipe $b^3$, which leads to a chamber $b^4$ inside of the receiver. The said chamber is provided with one or more outlets, the said outlets being preferably radially arranged around the chamber $b^4$, which is cylindrical in shape, and each outlet-opening is provided with a filling of foraminous material for the purpose of finally dividing the gas as it flows through. As herein shown, the outlets are in the form of internally-threaded radial openings through the wall of the chamber $b^4$, and each opening contains a short section of ratan $b^5$, having a thread cut on its outer surface, so that it can be screwed into the opening, as shown in Figs. 4 and 5. While it is not essential that ratan should be used for this purpose, this substance is especially available on account of its hardness, which admits of screw-threads being cut on the outer surface, and it is also straight-grained, there being a large number of fine parallel openings extending longitudinally through the wood.

It will be seen that the carbonating is thoroughly and rapidly accomplished by the expedients above described, the water on entering the body of gas being finely divided, so that each particle is acted upon by the gas, while the gas entering the accumulated body of water is also finely divided, thus acting in the same way.

In order to control the supply of water in the receiver, the inlet-pipe C is provided with a valve $d$, shown as coöperating with a valve-seat $d^2$, formed in a coupling-piece $d^3$, which contains inlet and outlet passages $d^4$ and $d^5$, secured, respectively, to sections of the main inlet-pipe C. The said coupling-piece $d^3$ is arranged to be secured, as indicated, to a tubular member $d^6$, secured in the wall of the receiver A, the said tubular member having pivotally supported therein a lever $e$, which is provided with a ball $e^2$ inside of the receiver. The said lever $e$ is so arranged as to coöperate with a rod $d^7$, which projects through a suitable stuffing-box in the coupling $d^3$ and acts upon the end of the valve $d$, which is normally held toward its seat by means of a spring $d^8$. The ball $e^2$ is made solid and is nearly equal in weight to an equal bulk of water, so that it has to be almost submerged in order to be supported in the position shown in Fig. 1. As the level of the water becomes lowered, therefore, the ball will drop, and the lever $e$, acting through the rod $d^7$, will unseat the valve $d$, thus permitting the flow of water into the receiver A, the supply thus being automatic. In order to shut off the supply, if desired, and prevent the automatic operation, the valve $d$ is also arranged to be operated upon by a manually-operating device $d^9$, shown as a rod screw-threaded in a supplemental coupling-piece $d^{10}$, the said rod being arranged to act directly upon the valve $d$ when screwed in, so as to hold the said valve seated. As indicated in Fig. 1, the said coupling-piece $d^{10}$ may be removed to afford access to the valve $d$, there being no passage for the escape of fluid from the receiver when said valve is removed, since the actuating-rod $d^7$ is packed, as described. The pipe C is further provided with a check-valve $C^3$, which prevents the escape of gas when the valve is removed, so that these parts are readily accessible for cleaning or repairs. It is desirable also to provide the pipe C with an additional check-valve $C^4$ below the coupling $d^3$ in order to prevent the escape of gas in case the valves above should leak.

The carbonated water is drawn from the carbonator through an outlet-pipe G, (see Fig. 4,) which is preferably secured in the coupling $b$, the said coupling having the passage $b^{20}$, to which is secured a pipe $b^{21}$, projecting into the receptacle to receive the carbonated water.

I claim—

1. In a carbonator, the combination with the receiver; of a water-inlet consisting of a duct extending into the said receiver; a shell at the end of said duct having a concave inner surface and an outlet at the middle; and a wall or partition interposed between said duct and said shell and provided with a plurality of passages through it, inclined diagonally from top to bottom to direct the water in streams against the concave inner surface of the shell.

2. In a carbonator, the combination with the receiver; of a water-inlet consisting of a duct extending into the said receiver and provided with lateral inlets, said duct being near the top of the receiver; a chamber surrounding said duct and formed in the receiver so as to contain gas which enters the said duct through said inlets; a shell at the end of said duct having a concave inner surface and an outlet at the middle; and a wall or partition between the said duct and the said shell provided with laterally-inclined openings through it to direct the water in streams against the concave inner surface of the shell.

3. In a carbonator, a receiver; an inlet-duct leading into said receiver; a chamber near the bottom of the receiver closed above and below and provided with a plurality of lateral openings; foraminous material to subdivide the gas issuing from said openings; and means for securing said material in said openings.

4. In a carbonator, a receiver; an inlet-duct leading into said receiver; a chamber near the bottom of the receiver closed above and below and provided with a plurality of lateral openings, internally screw-threaded; and sections of ratan screwed into said openings, substantially as described.

5. In a carbonator, the combination with the receiver; of an inlet-duct leading to said receiver; a valve-seat located in said duct; a valve for said seat; a stem disconnected from but coöperating with said valve and projecting into the receiver; a removable gland inclosing said valve; a stuffing-box for said stem; and means located within the receiver for actuating said stem, substantially as described.

6. In a carbonator, the combination with the receiver; of an inlet-pipe provided with a check-valve; a valve-shell coupled to said inlet-pipe and provided with a valve-seat; an actuating-stem for said valve extending through a wall of said coupling and having a water-tight fit in said wall; an opening in the wall of the receiver; means for connecting said valve-shell with the receiver at said opening; and means located within the receiver for actuating said valve-stem, as set forth.

7. In a carbonator, the combination with the receiver; of a water-inlet pipe; a valve located in said inlet-pipe; means located within the receiver for automatically operating said valve; a member interposed between said means and said valve and having a water-tight fit; a removable inclosing device for the valve; and a check-valve in the inlet-pipe between said valve and the receiver, as set forth.

8. In a carbonator, the combination with the receiver; of a water-inlet pipe; a valve located in said inlet-pipe; an actuating-stem for said valve projecting into the interior of the receiver and provided with a stuffing-box; a removable inclosing device for the said valve; and means located outside the receiver for maintaining said valve seated.

In testimony whereof I have signed my name to this specification in the presence of two subscribing witnesses.

EDWARD E. MURPHY.

Witnesses:
HENRY J. LIVERMORE,
JAS. J. MALONEY.